Aug. 14, 1945.     R. H. MOORE     2,381,981
INSULATED VEHICLE BODY
Filed June 23, 1943
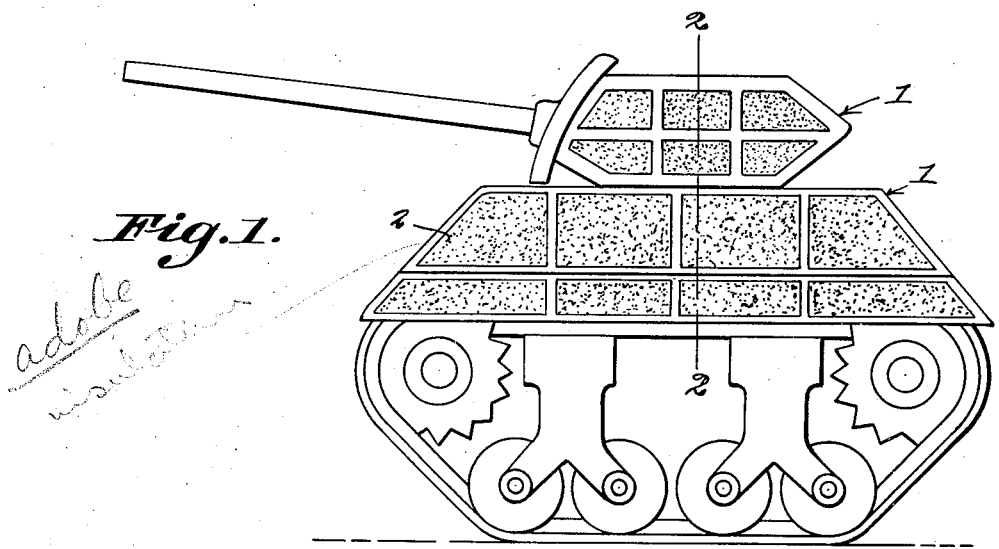
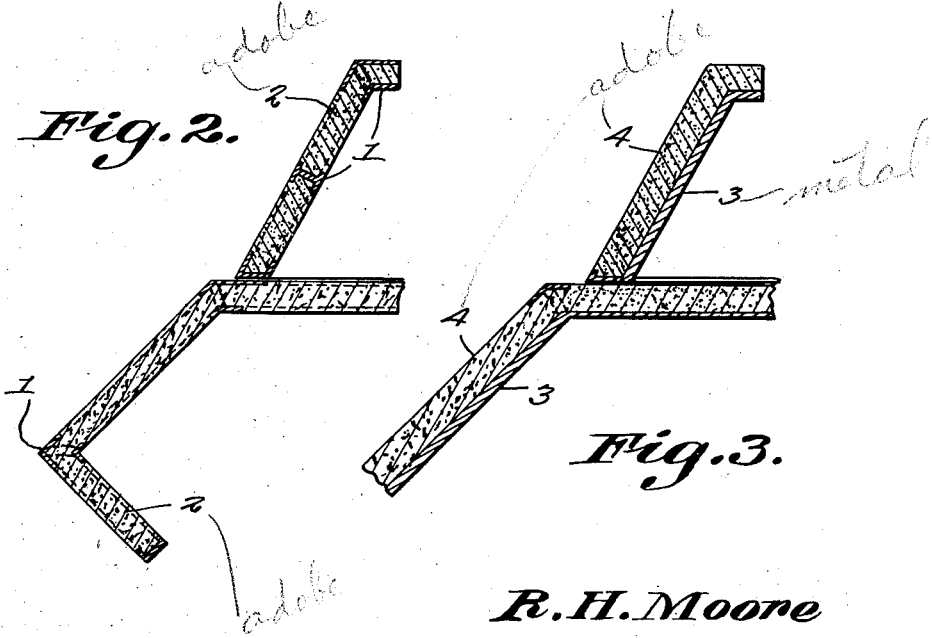
R. H. Moore
INVENTOR.
BY
ATTORNEYS.

Patented Aug. 14, 1945

2,381,981

UNITED STATES PATENT OFFICE 2,381,981

INSULATED VEHICLE BODY

Ralph H. Moore, Pasadena, Calif.

Application June 23, 1943, Serial No. 491,992

1 Claim. (Cl. 89—36)

This invention relates to insulated vehicle bodies and more especially to simple inexpensive but efficient means whereby the various vehicles, such as mechanized units, can be insulated so as to protect the occupants of the vehicles from extreme heat and cold.

It is a fact well known that occupants of trucks, tanks, and other motorized units such as employed in warfare, are afforded little if any protection from the intense heat encountered in tropical and semi-tropical areas nor is any protection from the cold afford in areas where the temperatures are very low. The metals used for protective purposes in vehicles of this type constitute excellent conductors of heat units with the result that considerable suffering from excessive temperatures has been endured by the operators of these vehicles.

It is an object of the present invention to improve upon the wall construction of mechanized units such as referred to so that the conduction of heat and cold to the interior space occupied by the operators will be greatly retarded and the interior atmosphere maintained at a temperature which will not cause excessive discomfort.

It is a further object to substitute for a considerable portion of the metal superstructure of vehicles, a body formed to a large extent of molded areas of a material having insulating properties and also having a high degree of resistance to penetration by small projectiles.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

In the accompanying drawing the preferred forms of the invention have been shown.

In said drawing

Figure 1 is a side elevation of a small motorized tank having the present improvements combined therewith.

Figure 2 is an enlarged section through a portion thereof on the line 2—2, Figure 1.

Figure 3 is a view similar to Figure 2 showing a modified construction.

It has been found through long extended experiments that structural material used extensively in the southwestern part of the United States and in Mexico and known as "adobe," has considerable value as a medium for insulating against conduction of heat and cold and also has the property of resisting penetration by bullets of the smaller gauges used in warfare. The present invention aims to utilize these properties for the protection of the operators of mechanized vehicles used in warfare by forming the body of each vehicle of open framework as indicated, for example, at 1 in Figs. 1 and 2. This framework is closed by panels 2 formed of adobe of a thickness sufficient to afford the desired protection against the heat and cold and also of a strength sufficient to resist the impact of projectiles from firearms of small caliber. Where units such as tanks, trucks, and the like, have their bodies formed of heavy protective steel, they will resist the fire of small firearms but when hit by projectiles from ordnance of large caliber, the resistance afforded by the heavily armored vehicles results usually not in the protection of the occupants but in the destruction of the unit because of the heavy impact, even where non-explosive projectiles are used. Because of this fact I have conceived the idea of constructing the bodies of motorized units so that the greater portion of each body will be made up of blocks or panels of adobe which, because of their insulating properties, will protect the occupants of the vehicle from excessive heat and cold and, because of their property of resisting impacts of small projectiles, will also protect the occupants from these projectiles. However through the use of adobe panels, the vehicle when hit by a projectile of large size, will not be destroyed because of the impact. Instead the projectile will shatter the panels in the path thereof and continue through the vehicle so that the only damage produced would be the shattering of these panels while occupants who are out of line of fire within the vehicle will not be injured.

Actual tests have indicated that blocks of adobe have the characteristic of absorbing or cushioning the shock produced by the impact of a small projectile thereagainst with the result that the only damage done to the adobe is the creation of a small pit. For that reason it constitutes not only efficient insulating and protective medium for use in the manner herein stated but is further valuable because, as before stated, should it be hit by a large projectile which otherwise through its impact and destructive force, would cause serious damage where the vehicle is made entirely of highly resistant metal, said projectile would pass completely through the vehicle, shattering only those panels in the path thereof.

In lieu of securing panels of adobe in a skeleton frame to form a complete body, a solid metal body 3 could be used, the outer surface of the body being coated with a layer of adobe indicated at 4 and extending throughout the extent of the body. This construction would be useful where protection against heat and cold is of primary importance but where it is desired also to protect against assaults with small firearms.

What is claimed is:

A vehicle for use under gunfire and as a protective medium in an intensely heated area, including a body having a wall, said wall including a layer of non-frangible, heat-resisting plastic material having the property of absorbing impact from firearm projectiles of small bores and retarding conduction of thermal units, said material consisting of adobe of the type found in the southwestern part of the United States.

RALPH H. MOORE.